United States Patent
Liu

(10) Patent No.: US 9,063,607 B2
(45) Date of Patent: Jun. 23, 2015

(54) DUAL MODE TOUCH SENSING MODULE AND DUAL MODE TOUCH SENSING DISPLAY

(76) Inventor: Hung-Ta Liu, Zhubei (TW)

(*) Notice: Subject to any disclaimer, the term of this patent is extended or adjusted under 35 U.S.C. 154(b) by 174 days.

(21) Appl. No.: 13/339,667

(22) Filed: Dec. 29, 2011

(65) Prior Publication Data

US 2012/0169400 A1 Jul. 5, 2012

(30) Foreign Application Priority Data

Dec. 31, 2010 (TW) .................. 99147268 A

(51) Int. Cl.
*G06F 3/041* (2006.01)
*G06F 3/044* (2006.01)
*G06F 3/046* (2006.01)

(52) U.S. Cl.
CPC .............. *G06F 3/0416* (2013.01); *G06F 3/044* (2013.01); *G06F 3/046* (2013.01); *G06F 2203/04106* (2013.01)

(58) Field of Classification Search
CPC ...................................... G06F 3/044
USPC ........................................................ 345/173
See application file for complete search history.

(56) References Cited

U.S. PATENT DOCUMENTS

| | | | |
|---|---|---|---|
| 5,905,489 A * | 5/1999 | Takahama et al. | 345/174 |
| 7,679,376 B2 * | 3/2010 | Kang et al. | 324/658 |
| 8,243,027 B2 * | 8/2012 | Hotelling et al. | 345/173 |
| 8,933,897 B2 * | 1/2015 | Liu | 345/173 |
| 2005/0231487 A1 * | 10/2005 | Ming | 345/173 |
| 2011/0285640 A1 * | 11/2011 | Park et al. | 345/173 |

* cited by examiner

*Primary Examiner* — Roy Rabindranath
(74) *Attorney, Agent, or Firm* — Sheridan Ross P.C.

(57) ABSTRACT

A dual mode touch sensing display includes a display module, and a dual mode touch sensing module disposed at the display module. The dual mode touch sensing module includes a plurality of first conductors, a plurality of second conductors, and a switch unit. The first conductors extend in a first direction. The second conductors extend in a second direction intersecting the first direction. The switch unit includes a first switch circuit coupled to the first conductors and capable of interconnecting at least a portion of the first conductors to form sensing loops, and a second switch circuit coupled to the second conductors and capable of interconnecting at least a portion of the second conductors to form sensing loops.

13 Claims, 12 Drawing Sheets

DUAL MODE TOUCH SENSING MODULE AND DUAL MODE TOUCH SENSING DISPLAY

CROSS-REFERENCE TO RELATED APPLICATION

This application claims priority of Taiwanese Application No. 099147268, filed on Dec. 31, 2010.

BACKGROUND OF THE INVENTION

1. Field of the Invention

The present invention relates to a display, more particularly to a dual mode touch sensing display.

2. Description of the Related Art

A touch screen panel is a panel provided for sensing touch by a user via a finger or a stylus. The user may use the touch screen panel for writing, drawing, or inputting instructions through icons on a screen of the touch screen panel. In general, touch screen panels may be categorized into an electromagnetic sensing type, a capacitive sensing type, and a dual mode sensing type combining the electromagnetic sensing function and the capacitive sensing function.

Referring to FIG. 1, a conventional electromagnetic touch sensing module 900 is illustrated, and includes a plurality of first sensing lines 911, a plurality of second sensing lines 912 intersecting the first sensing lines 911, and two sensing circuits 913 each coupled to a respective one of the first sensing lines 911 and the second sensing lines 912. The electromagnetic touch sensing module 900 uses the two sensing circuits 913 to respectively sense variations in current, frequency, and magnetic flux of the first sensing lines 911 and the second sensing lines 912, so as to determine a touch position of a magnetic stylus, or an electromagnetic stylus with a LC loop or a magnetic flux component.

Referring to FIG. 2, a conventional capacitive touch sensing module 920 is illustrated, and includes a plurality of first electrode patterns 921 disposed parallel to each other, and a plurality of second electrode patterns 922 that are disposed parallel to each other and that are staggered with the first electrode patterns 921. The capacitive touch sensing module 920 uses overlapping portions of the first and second electrode patterns 921, 922 and capacitors of proximate electrodes to sense variations in redistribution of electric charges resulting from touching by a finger of the user, so as to detect touch actions by the user.

Referring to FIG. 3, a conventional dual sensing mode touch screen panel may achieve an effect of combining electromagnetic sensing and capacitive sensing by means of disposing the capacitive sensing module 920 and the electromagnetic sensing module 900 onto opposite surfaces of a Liquid Crystal Display Module (LCM) 930. However, such design may increase an overall thickness of a display, and may increase a production cost of the display.

SUMMARY OF THE INVENTION

Therefore, an object of the present invention is to provide a dual mode touch sensing display which has a reduced overall thickness, which incurs a lower production cost, and which combines a stylus input function and a finger input function.

Accordingly, the dual mode touch sensing display of this invention comprises a display module, and a dual mode touch sensing module disposed at the display module. The dual mode touch sensing module includes a plurality of first conductors, a plurality of second conductors, an insulating layer, and a switch unit. The plurality of first conductors are disposed parallel to each other and extend in a first direction. The plurality of second conductors are disposed parallel to each other and extend in a second direction intersecting the first direction. The second conductors cross the first conductors at an angle. The insulating layer is disposed at intersections of the first conductors and the second conductors to space the first conductors apart from the second conductors. The switch unit includes a first switch circuit coupled to the first conductors, and a second switch circuit coupled to the second conductors. The first switch circuit is capable of interconnecting at least a portion of the first conductors to form sensing loops, and the second switch circuit is capable of interconnecting at least a portion of the second conductors to form sensing loops.

Preferably, the dual mode touch sensing display is selected from a Liquid Crystal Display (LCD), an Active Matrix Organic Light Emitting Display (AMOLED), an Electrophoretic Display, an Electrode Wetting Display, etc.

Preferably, each of the first and second conductors is made of a material independently selected from a metal material, an alloy material, and a transparent conductive material, such as an Indium Tin Oxide (ITO) material, an Indium Zinc Oxide (IZO) material, a Carbon NanoTube (CNT) material, etc. The first conductors are disposed at a first layer. The second conductors are disposed at a second layer, and the first and second layers are spaced apart from each other by the insulating layer. Alternatively, the first conductors and a first segment of the second conductors are disposed at a first layer and are covered by and spaced apart from each other by the insulating layer. A second segment of the second conductors is disposed at a second layer on one side of the insulating layer opposite to the first layer and extends through the insulating layer to connect electrically with the first segment of the second conductors.

Preferably, the dual mode touch sensing module further includes a sensing unit coupled to the first conductors and the second conductors. The sensing unit is configured to sense signals on the first conductors and the second conductors resulting from switching of the switch unit.

Preferably, the first switch circuit includes a first common line, at least one first control line, a plurality of first switch members, and a first gate driver coupled to the at least one first control line. The first switch members correspond in number to the first conductors. Each of the first switch members has a first end coupled to one end of a respective one of the first conductors, a second end coupled to the first common line, and a control end coupled to the at least one first control line.

The second switch circuit includes a second common line, at least one second control line, a plurality of second switch members, and a second gate driver coupled to the at least one second control line. The second switch members correspond in number to the second conductors. Each of the second switch members has a first end coupled to one end of a respective one of the second conductors, a second end coupled to the second common line, and a control end coupled to the at least one second control line.

In a first preferred embodiment, the display module is a liquid crystal display module including a plurality of layers. The layers include in sequence a first polarizer, a first substrate, a color filter, a common electrode layer, a liquid crystal layer, a pixel layer, a second substrate, and a second polarizer. The first conductors and the second conductors of the dual mode touch sensing module are respectively disposed at any adjacent two of the layers between the second polarizer and the pixel layer.

In a second preferred embodiment, the display module is a liquid crystal display module including a plurality of layers. The layers include in sequence a first polarizer, a first substrate, a pixel layer, a liquid crystal layer, a common electrode layer, an insulator, a color filter, a second substrate, and a second polarizer. The first conductors and the second conductors of the dual mode touch sensing module are respectively disposed at any adjacent two of the layers between the second polarizer and the insulator.

In a third preferred embodiment, the display module is a liquid crystal display module including a plurality of layers. The layers include in sequence a first polarizer, a first substrate, a common electrode and pixel layer, a liquid crystal layer, an overcoat layer, a color filter, a second substrate, and a second polarizer. The first conductors and the second conductors of the dual mode touch sensing module are respectively disposed at any adjacent two of the layers between the second polarizer and the liquid crystal layer.

In the aforesaid first to third preferred embodiments, the LCD is selected from a transmissive LCD, a reflective LCD, and a transflective LCD. When the LCD is the reflective LCD, the aforementioned first polarizer may be omitted. When the LCD is one of the transmissive LCD and the transflective LCD, a back light source is disposed at one side of the LCD.

In a fourth preferred embodiment, the display module is an Active Matrix Organic Light Emitting Display (AMOLED) including in sequence a first substrate, an organic light emitting element, an insulator, and a second substrate. The first conductors and the second conductors of the dual mode touch sensing module are respectively disposed at one of one side of the second substrate away from the insulator, and between the second substrate and the insulator.

In a fifth preferred embodiment, the dual mode touch sensing module includes a sensing unit, a switching unit, a capacitive sensing unit, and an electromagnetic sensing unit. The sensing unit includes a first sensing circuit and a second sensing circuit. The switch unit includes a first switch circuit electrically coupled to the first sensing circuit, and a second switch circuit electrically coupled to the second sensing circuit.

The capacitive sensing unit includes a plurality of first electrode patterns that are disposed parallel to each other and that extend in a first direction, and a plurality of second electrode patterns that are disposed parallel to each other and that extend in a second direction. Each of the first electrode patterns has an end electrically coupled to the first switch circuit. Each of the second electrode patterns has an end electrically coupled to the second switch circuit. The electromagnetic sensing unit includes a plurality of first conductors and a plurality of second conductors. Each of the first conductors forms a sensing loop, and has two ends electrically coupled to the first switch circuit. Each of the second conductors forms a sensing loop, and has two ends electrically coupled to the second switch circuit. Through switching control of the first switch circuit and the second switch circuit, each of the first sensing circuit and the second sensing circuit is capable of sensing changes in at least one of current, frequency, magnetic flux, and electromagnetic induction on the sensing loops formed by a respective group of the first conductors and the second conductors, and is further capable of sensing changes in at least one of electric charge, capacitance, and voltage on adjacent ones of the first and second electrode patterns.

The display module is a liquid crystal display module including a plurality of layers. The layers include in sequence a first polarizer, a first substrate, a pixel layer, a liquid crystal layer, a common electrode layer, a first insulator, a second insulator, a color filter, a second substrate, and a second polarizer.

The first and second conductors of the electromagnetic sensing unit are respectively disposed at one of between the second substrate and the second polarizer, between the color filter and the second substrate, between the second insulator and the color filter, between the first insulator and the second insulator, between the first substrate and the pixel layer, between the first polarizer and the first substrate, and one side of the first polarizer opposite to the first substrate.

The first and second electrode patterns of the capacitive sensing unit are respectively disposed between any adjacent two of the layers between the second polarizer and the first insulator.

In a sixth preferred embodiment, the display module is a liquid crystal display module including a plurality of layers. The layers include in sequence a first polarizer, a first substrate, a common electrode and pixel layer, a liquid crystal layer, an overcoat layer, a color filter, a second substrate, and a second polarizer.

The first and second conductors of the electromagnetic sensing unit are respectively disposed at one of between the second substrate and the second polarizer, between the color filter and the second substrate, between the overcoat layer and the color filter, between the liquid crystal layer and the overcoat layer, between the first substrate and the common electrode and pixel layer, between the first polarizer and the first substrate, and one side of the first polarizer opposite to the first substrate.

The first and second electrode patterns of the capacitive sensing unit are respectively disposed between any adjacent two of the layers between the second polarizer and the liquid crystal layer.

In a seventh preferred embodiment, the display module is an Active Matrix Organic Light Emitting Display (AMOLED) including in sequence a first substrate, an organic light emitting element, an insulator, and a second substrate.

The first and second conductors of the electromagnetic sensing unit are respectively disposed at one of one side of the second substrate away from the insulator, between the second substrate and the insulator, between the insulator and the organic light emitting element, between the organic light emitting element and the first substrate, and one side of the first substrate away from the organic light emitting element.

The first and second electrode patterns of the capacitive sensing unit are respectively disposed at one of one side of the second substrate away from the insulator, and between the second substrate and the insulator.

Preferably, the dual mode touch sensing display further comprises a housing for accommodating the display module and the dual mode touch sensing module. The housing includes a protection panel corresponding in position to the display module. The dual mode touch sensing module is disposed at one of between the protection panel and the display module, one side of the protection panel away from the display module, and in the protection panel.

Another object of the present invention is to provide a dual mode touch sensing module combining a capacitive sensing function and an electromagnetic sensing function.

Accordingly, the dual mode touch sensing module of this invention comprises a plurality of first conductors, a plurality of second conductors, an insulating layer, and a switch unit.

The plurality of first conductors are disposed parallel to each other and extend in a first direction. The plurality of second conductors are disposed parallel to each other and extend in a second direction intersecting the first direction. The second conductors cross the first conductors at an angle. The insulating layer is disposed at intersections of the first conductors and the second conductors to space the first conductors apart from the second conductors. The switch unit includes a first switch circuit coupled to the first conductors, and a second switch circuit coupled to the second conductors. The first switch circuit is capable of interconnecting at least a portion of the first conductors to form sensing loops, and the second switch circuit is capable of interconnecting at least a portion of the second conductors to form sensing loops.

The effect of the present invention resides in that the dual mode touch sensing module is disposed at the display module so as to reduce an overall thickness of the dual mode touch sensing display, and to lower the production cost thereof. Moreover, the dual mode touch sensing module is capable of combining the stylus input function and the finger input function for providing convenience to users of the present invention.

BRIEF DESCRIPTION OF THE DRAWINGS

Other features and advantages of the present invention will become apparent in the following detailed description of the eight preferred embodiments with reference to the accompanying drawings, of which.

DETAILED DESCRIPTION OF THE PREFERRED EMBODIMENTS

Figure 1:
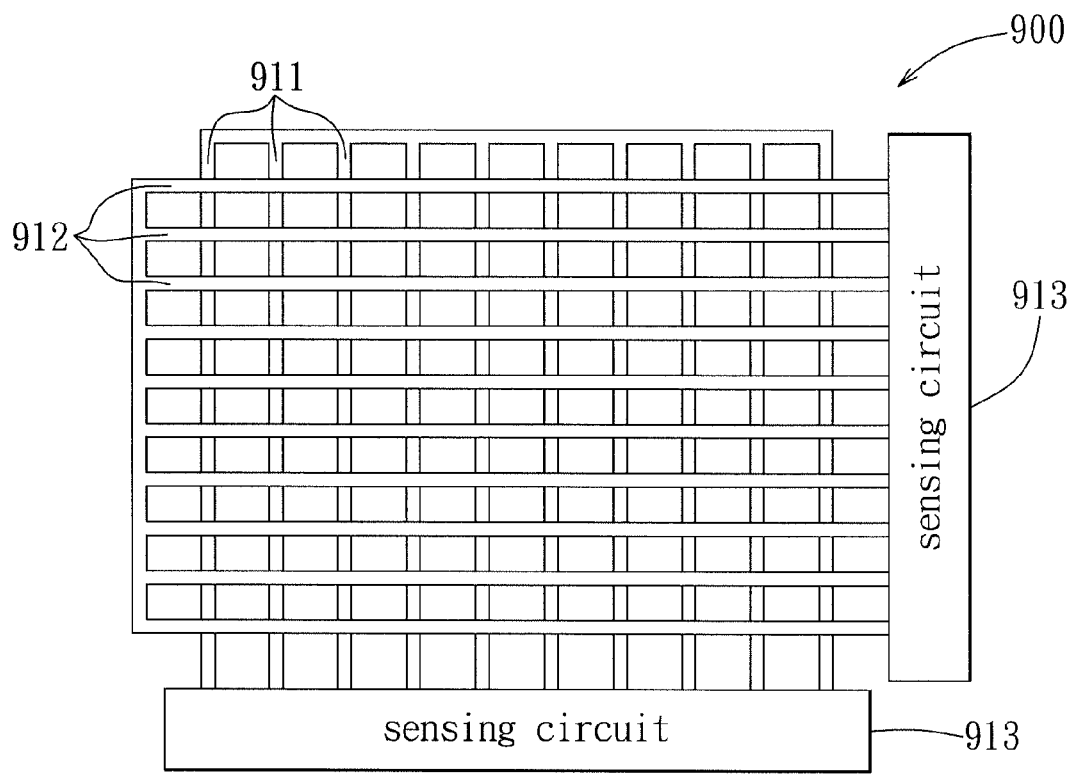
FIG. 1 is a schematic diagram illustrating a conventional electromagnetic touch sensing module.
Figure 2:
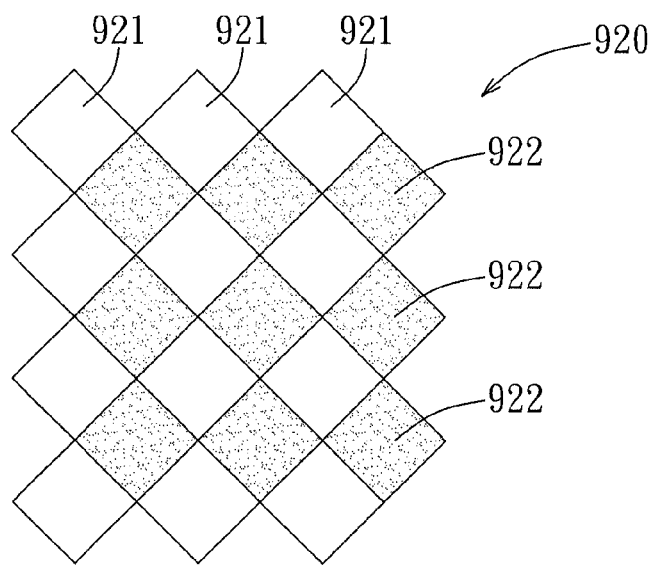
FIG. 2 is a schematic diagram illustrating a conventional capacitive touch sensing module.
Figure 3:
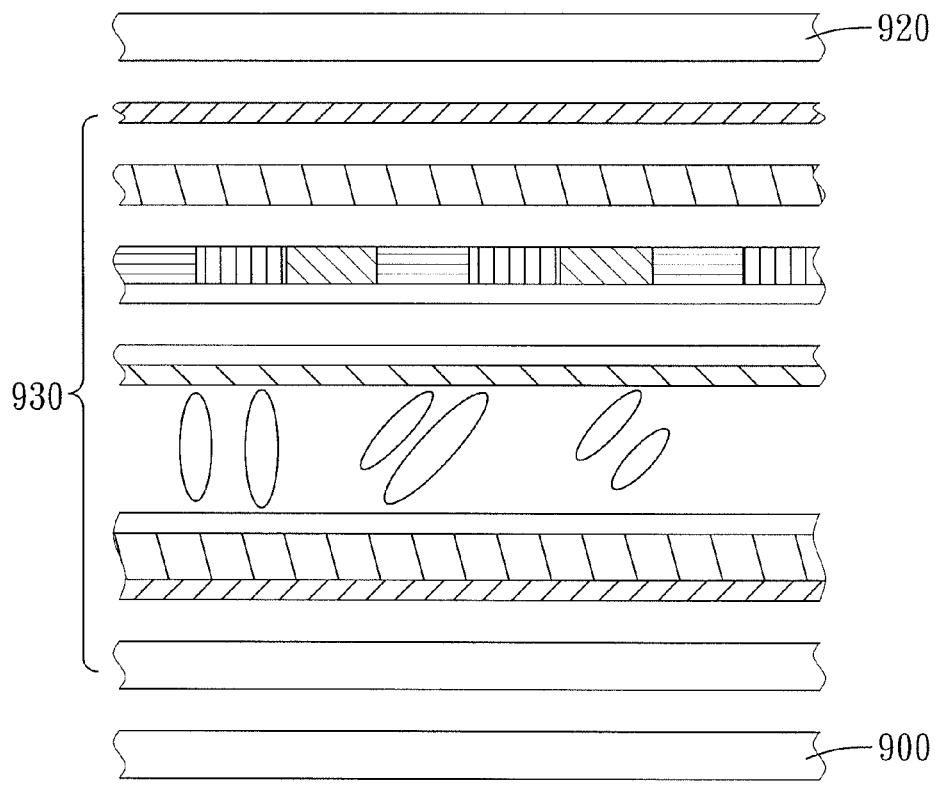
FIG. 3 is an exploded partly sectional view illustrating a conventional dual sensing mode touch screen panel.

Before the present invention is described in greater detail with reference to the preferred embodiments, it should be noted that the same reference numerals are used to denote the same elements throughout the following description.

Figure 4:
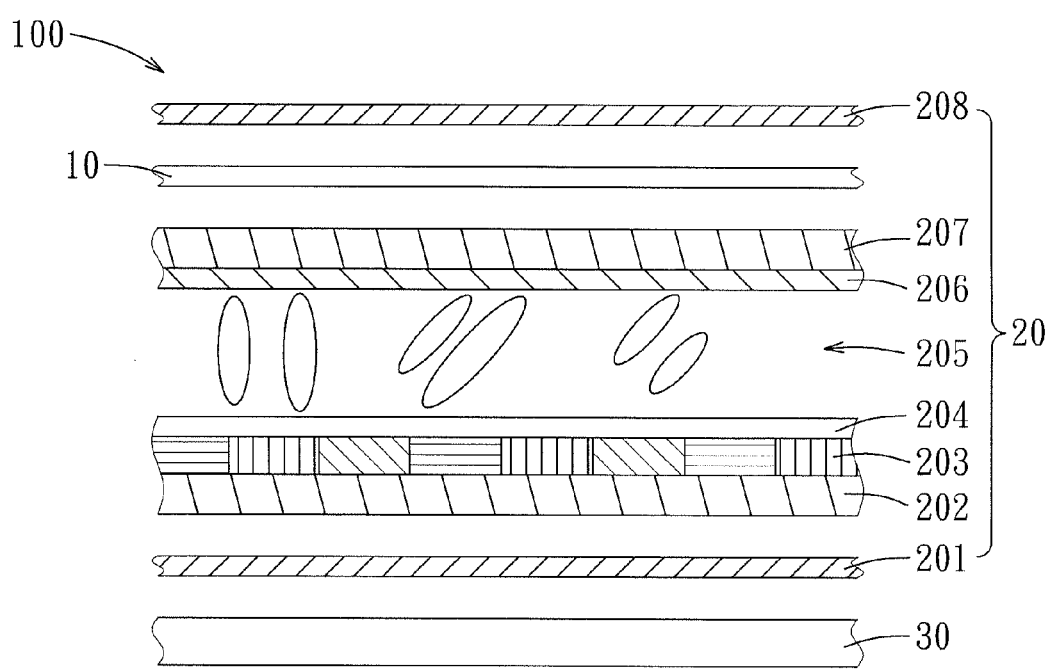
FIG. 4 is an exploded partly sectional view illustrating a display of a first preferred embodiment according to the present invention.
Figure 5:
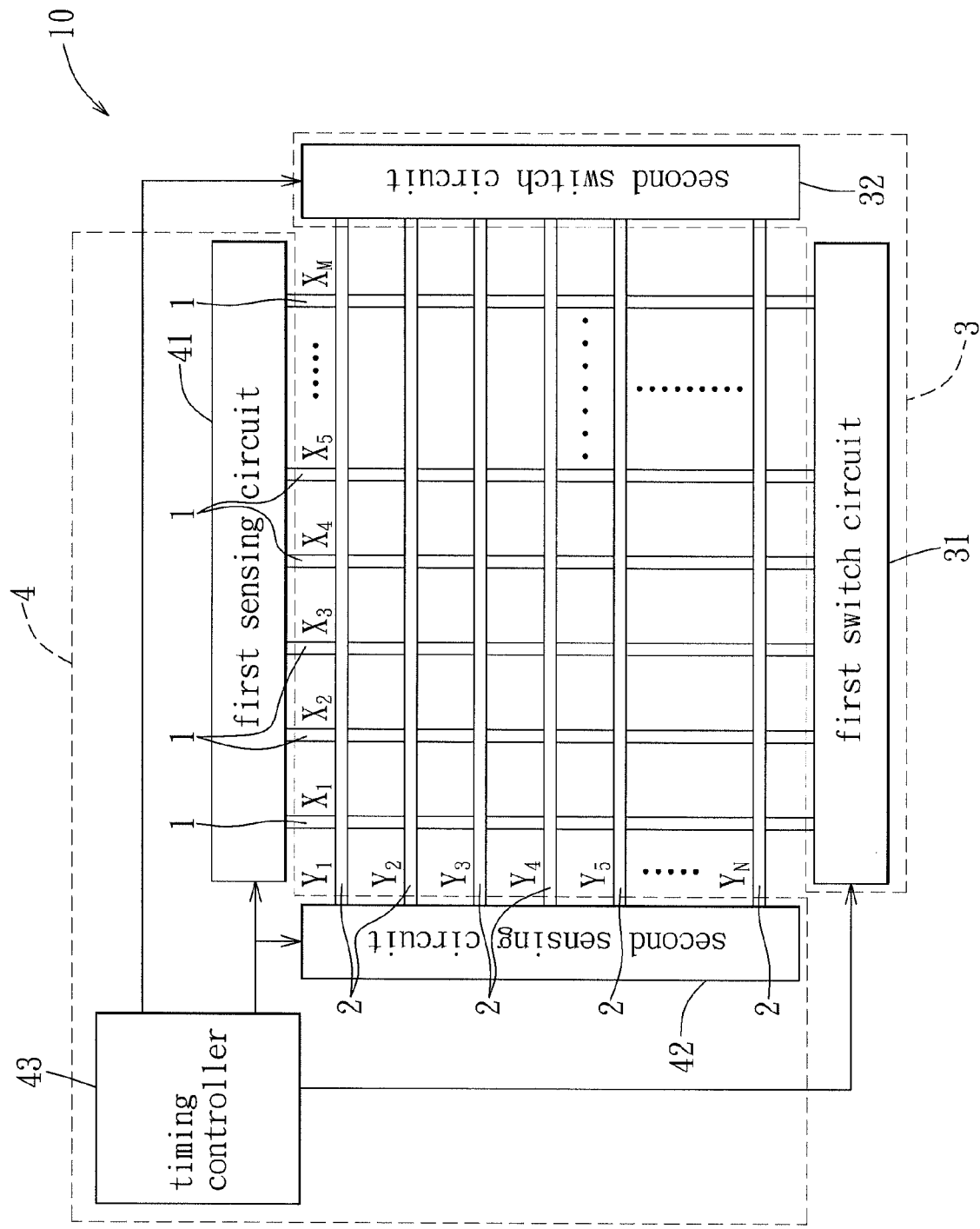
FIG. 5 is a schematic diagram illustrating a dual mode touch sensing module of the first preferred embodiment.

Referring to FIG. 4 and FIG. 5, a first preferred embodiment of a dual mode touch sensing display 100, according to the present invention, is illustrated. The dual mode touch sensing display 100 is exemplified as a liquid crystal display (LCD), and combines a capacitive sensing function and an electromagnetic sensing function. In this embodiment, the dual mode touch sensing display 100 comprises a dual mode touch sensing module 10, a display module 20, and a backlight source 30. The display module 20 in this embodiment is a Liquid Crystal Display Module (LCM).

Figure 6:
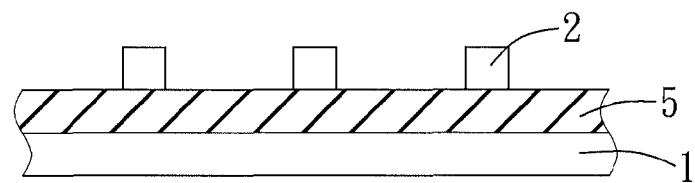
FIG. 6 is a partly sectional schematic side view illustrating first conductors, second conductors, and an insulating layer disposed at different layers, respectively.

Referring to FIG. 5, the dual mode touch sensing module 10 includes a plurality of first conductors 1, a plurality of second conductors 2, a switch unit 3, a sensing unit 4, and an insulating layer 5 (or a dielectric layer, see FIG. 6). The first conductors 1 are metal lines, and are M in number. M is a positive integer greater than 1, and the first conductors 1 are denoted from $X_1$ to $X_M$. The first conductors 1 are disposed parallel to each other at a preset distance, and extend in a first direction (i.e., the longitudinal direction). The second conductors 2 are metal lines, and are N in number. N is a positive integer greater than 1, and the second conductors 2 are denoted from $Y_1$ to $Y_N$. The second conductors 2 are disposed parallel to each other at a preset distance, and extend in a second direction (i.e., the transverse direction) intersecting the first direction. In this embodiment, the insulating layer 5 is disposed at intersections of the first conductors 1 and the second conductors 2 to space the first conductors 1 apart from the second conductors 2, such that the first conductors 1 cross the second conductors 2 to form a M×N sensing matrix. An angle at which the first conductors 1 cross the second conductors 2 is a right angle, that is, the first direction is perpendicular to the second direction. However, the angle is not limited to the disclosure in this embodiment, and the angle may range from 60 degrees to 120 degrees.

Figure 7:
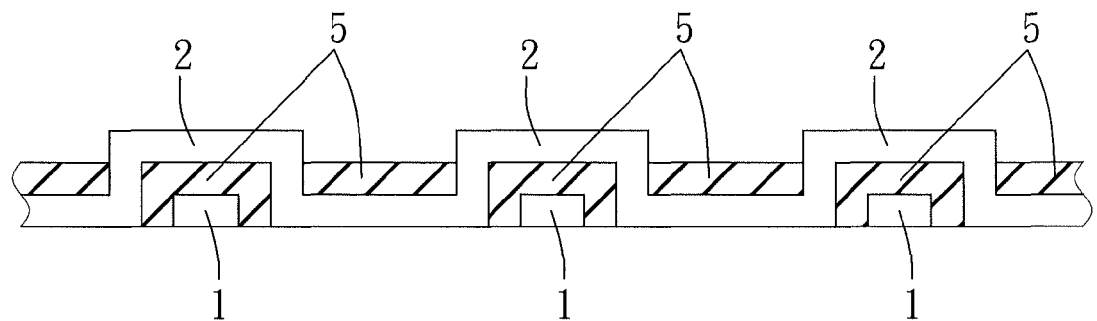
FIG. 7 is a partly sectional schematic side view illustrating that the first conductors and a first segment of the second conductors are disposed at a first layer, and a second segment of the second conductors is disposed at a second layer.

Aside from the metal material, each of the first and second conductors 1, 2 may be made of a material independently selected from an alloy material, and a transparent conductive material, such as an Indium. Tin Oxide (ITO) material, an Indium Zinc Oxide (IZO) material, a Carbon NanoTube (CNT) material, or combinations thereof. Moreover, referring to FIG. 6, the first conductors 1 are disposed at a first layer. The second conductors 2 are disposed at a second layer, and the first and second layers 1, 2 are spaced apart from each other by the insulating layer 5. In another configuration, referring to FIG. 7, the first conductors 1 and a first segment of the second conductors 2 are disposed at a first layer and are covered by and spaced apart from each other by the insulating layer 5. A second segment of the second conductors 2 is disposed at a second layer on one side of the insulating layer 5 opposite to the first layer, and extends through the insulating layer 5 to connect electrically with the first segment of the second conductors 2.

Figure 8:
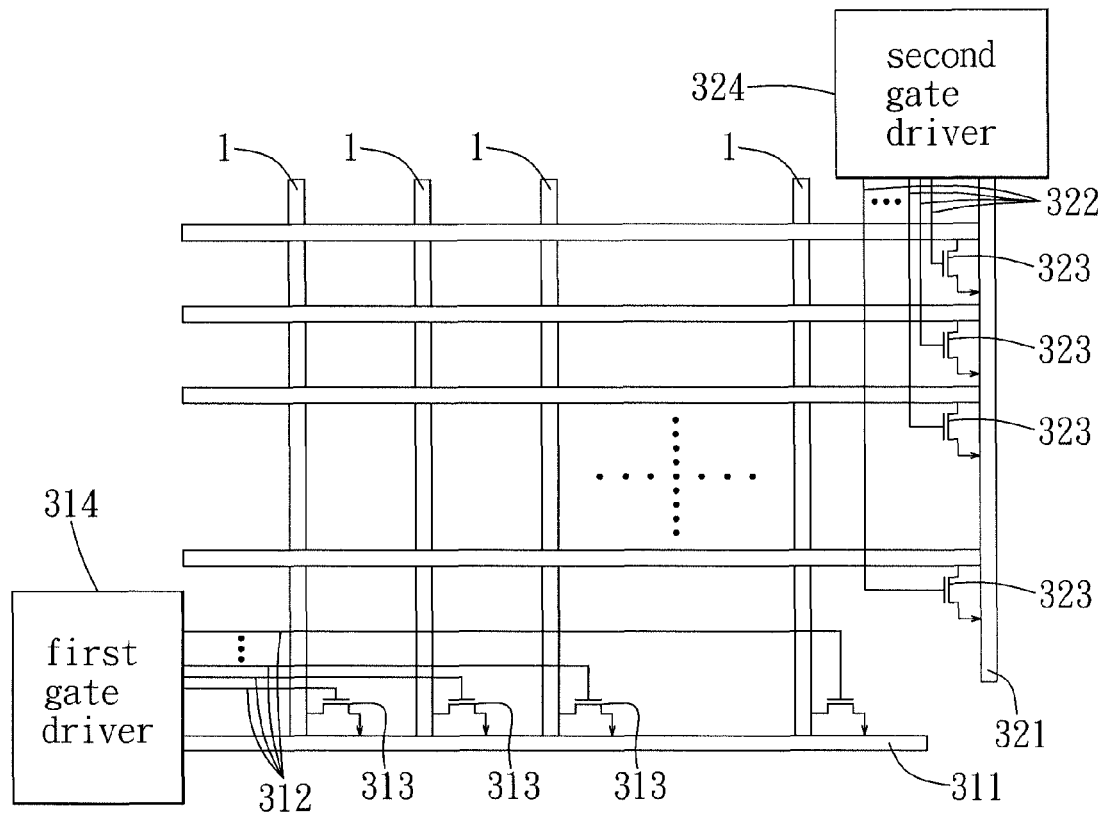
FIG. 8 is a schematic diagram illustrating a switch unit of the first preferred embodiment.

Referring to FIG. 5 and FIG. 8, the switch unit 3 includes a first switch circuit 31 coupled to the first conductors 1, and a second switch circuit 32 coupled to the second conductors 2. The first switch circuit 31 includes a first common line 311, at least one first control line 312, a plurality of first switch members 313, and a first gate driver 314 coupled to the at least one first control line 312. In this embodiment, the at least one first control line 312 and the first switch members 313 correspond in number with the first conductors 1. The first switch members 313 are selected from a metal-oxide-semiconductor field-effect transistor (MOSFET) switch, a thin-film transistor (TFT) switch, and a thin-film diode (TFD) switch. Each of the first switch members 313 has a first end coupled to one end of a respective one of the first conductors 1, a second end coupled to the first common line 311, and a control end (a gate electrode) coupled to one of the at least one first control line 312.

The second switch circuit 32 has substantially the same circuit structure as the first switch circuit 31. The second switch circuit 32 includes a second common line 321, at least one second control line 322, a plurality of second switch members 323, and a second gate driver 324 coupled to the at least one second control line 322. In this embodiment, the at least one second control line 322 and the second switch members 323 correspond in number with the second conductors 2. Like the first switch members 313, the second switch members 323 are selected from a MOSFET switch, a TFT switch, and a TFD switch. Each of the second switch members 323 has a first end coupled to one end of a respective one of the second conductors 2, a second end coupled to the second common line 321, and a control end (a gate electrode) coupled to one of the at least one second control line 322.

It should be noted that relations between the first switch members 313 (or the second switch members 323) and the at least one first control line 312 (or the at least one second control line 322) are not limited to 1-to-1. A portion of or all of the first switch members 313 (or the second switch members 323) may be connected to the same first control line 312 (or the same second control line 322), may correspond with one or a plurality of the first common lines 311 (or the second common lines 312), and are not limited to the disclosure of this embodiment.

The sensing unit 4 is configured to sense signals on the first conductors 1 and the second conductors 2 so as to determine a touch position, a distance away from the display, touch intensity, etc. at the display module 20. The sensing unit 4 includes a first sensing circuit 41 coupled to another end of each of the first conductors 1, a second sensing circuit 42 coupled to another end of each of the second conductors 2, and a timing controller 43 coupled to the first sensing circuit 41, the second sensing circuit 42, the first gate driver 314 of the first switch circuit 31, and the second gate driver 324 of the second switch circuit 32.

In practical operation, a liquid crystal display module (LCM) is given as an example for the display module 20. An image displayed by the LCM is refreshed at a frequency of 60 Hz (16.66 ms), that is, the timing controller 43 is required to generate a frame at the frequency of 60 Hz. Therefore, the timing controller 43 is configured to divide a frame time into three time periods, i.e., T1 to T3. The first time period T1 is provided for image display by the display module 20. The second time period T2 is electromagnetic sensing time, during which the timing controller 43 is configured to control the first gate driver 314 to drive the first switch members 313 so as to electrically interconnect in sequence one of adjacent two of the first conductors 1 and two of the first conductors 1 spaced at a predetermined distance, such that sensing loops are formed. The timing controller 43 is further configured to control the first sensing circuit 41 to generate a detecting signal so as to sense a longitudinal touch position of a magnetic stylus (or an electromagnetic stylus with a changing magnetic flux).

Figure 9:
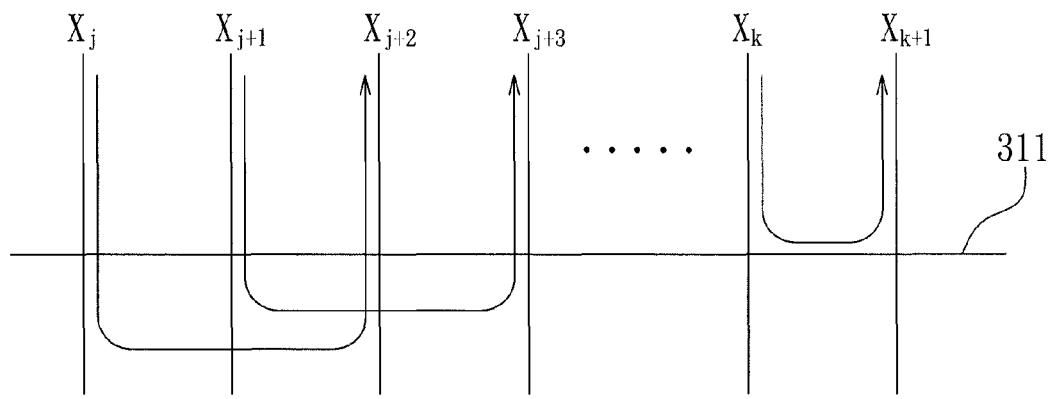
FIG. 9 is a schematic diagram illustrating sensing loops formed by $X_j$-th and $X_{j+2}$-th first conductors, $X_{j+1}$-th and $X_{j+3}$-th first conductors, and $X_k$-th and $X_{k+1}$-th first conductors, respectively.

It is further explained with reference to FIG. 9 that the $X_j$-th first conductor 1 and the $X_{j+2}$-th first conductor 1 are coupled electrically to the first common line 311 as a result of ON states of the corresponding first switch members 313, such that said two first conductors 1 form a sensing loop for current flow of the detecting signal generated by the first sensing circuit 41. Moreover, the $X_{j+1}$-th first conductor 1 and the $X_{j+3}$-th first conductor 1 are also coupled electrically to the first common line 311 as a result of ON states of the corresponding first switch member 313, such that said two first conductors 1 form another sensing loop for the current flow of the detecting signal. Each of the two sensing loops has a corresponding detecting region, and the two detecting regions overlap at an overlapping region (from $X_{j+1}$ to $X_{j+2}$ so as to prevent occurrence of a blind spot during detection.

On the other hand, the $X_j$-th first conductor 1, the $X_{j+1}$-th first conductor 1, the $X_k$-th first conductor 1, and the $X_{k+1}$-th first conductor 1 are coupled electrically to the first common line 311 as a result of ON states of the corresponding first switch members 313, such that said four first conductors 1 may form a dual loop for the current flow of the detecting signal.

The first sensing circuit 41 is configured to determine whether the electromagnetic stylus touches each of the sensing loops according to changes in voltage, current, frequency, etc. resulting from the current flow of the detecting signal through a respective one of the sensing loops, so as to detect and sense a touch. The first sensing circuit 41 is further configured to determine a touch position, a distance, a touch height, and touch intensity at which the change is detected by means of computations. Therefore, the first gate driver 314 is configured to electrically couple in sequence one of the adjacent two of the first conductors 1 and the two of the first connectors 1 spaced at the predetermined distance to the first common line 311, such that the first sensing circuit 41 is capable of sensing signals on all of the longitudinal first conductors 1.

Similarly, after all sensing processes along the longitudinal direction are successfully completed, the timing controller 43 is configured to control the second gate driver 324 to drive the second switch members 323 so as to electrically interconnect in sequence one of adjacent two of the second conductors 2 and two of the second connectors 2 spaced at a predetermined distance, such that sensing loops are formed. The second sensing circuit 42 is capable of sensing signals on all of the transverse second conductors 2 so as to determine a transverse touch position of the electromagnetic stylus. In this way, after such bidirectional sensing is performed, the touch position of the electromagnetic stylus is acquired.

It should be noted that the first gate driver 314 (or the second gate driver 324) is not limited to sense only one of the sensing loops at one time, and may sense multiple sensing loops simultaneously. For example, the sensing loop formed by the $X_j$-th and $X_{j+3}$-th first conductors 1 and the sensing loop formed by the $X_k$-th and $X_{k+3}$-th first conductors 1 may be sensed simultaneously. Moreover, the sensing loops are formed by one of adjacent two of the first conductors 1 (or the second conductors 2) and two of the second connectors (or the second conductors 2) spaced at the predetermined distance, and are not limited to the disclosure in this embodiment.

The third time period T3 is capacitive sensing time, during which the timing controller 43 is configured to turn the first gate driver 314 and the second gate driver 324 off, that is, the first conductors 1 are not coupled electrically with each other, and the second conductors 2 are not coupled electrically with each other. The first sensing circuit 41 and the second sensing circuit 42 are configured to utilize capacitors formed at the intersections of the first and second conductors 2, and induction capacitors formed between the first and second conductors 1, 2. When the user touches the dual mode touch sensing display 100 with a finger, electric charges in the first and second conductors 1, 2 are redistributed, and capacitance between the first and second conductors 1, 2 varies as a result of grounding by the finger. The first sensing circuit 41 and the second sensing circuit 42 are further configured to sense changes in at least one of electric charge, capacitance, voltage, and current on the aforesaid capacitors so as to detect a touch position, a height away from the dual mode touch sensing display 100, and sensing intensity attributed to the finger.

Referring to FIG. 4, the display module 20 includes a plurality of layers. The layers include in sequence a first polarizer 201, a first substrate 202, a color filter 203, a common electrode layer 204, a liquid crystal layer 205, a pixel layer 206, a second substrate 207, and a second polarizer 208. In this embodiment, the first conductors 1 and the second conductors 2 of the dual mode touch sensing module 10 are disposed between the second substrate 207 and the second polarizer 208 for preventing a capacitive sensing effect of the dual mode touch sensing 10 from being adversely influenced by screening effect of the common electrode layer 204. However, dispositions of the first and second conductors 1, 2 are not limited to the disclosure of this embodiment, and the first conductors 1 and the second conductors 2 may be respectively disposed at any adjacent two of the layers between the second polarizer 208 and the pixel layer 206.

In this embodiment, the first and second conductors 1, 2 are interconnected respectively to form the sensing loops. By means of switching of the first switch members 313 and the second switch members 323 (i.e., ON and OFF states), the sensing unit 4 is capable of sensing and detecting data, such as values, intensity (or relative intensity), peak variances, averages, etc. of an electromagnetic sensing touch performed using one of the electromagnetic stylus and the magnetic stylus, and a capacitance sensing touch performed using the finger, so as to achieve an effect of combining electromagnetic sensing function and capacitive sensing function in the present invention. Moreover, since the dual mode touch sensing module 10 is disposed in the display module 20, an overall thickness of the dual mode touch sensing display 100 may be reduced and a production cost thereof may be lowered.

It should be noted that the display module 20 is selected from a transmissive display panel, a reflective display panel, and a transflective display panel. If the reflective display panel is adopted, the dual mode touch sensing display 100 of this embodiment does not need the backlight source 30 and the first polarizer 201, and the display module 20 may utilize external light beams (for example, sunlight) as the light source.

Figure 10:
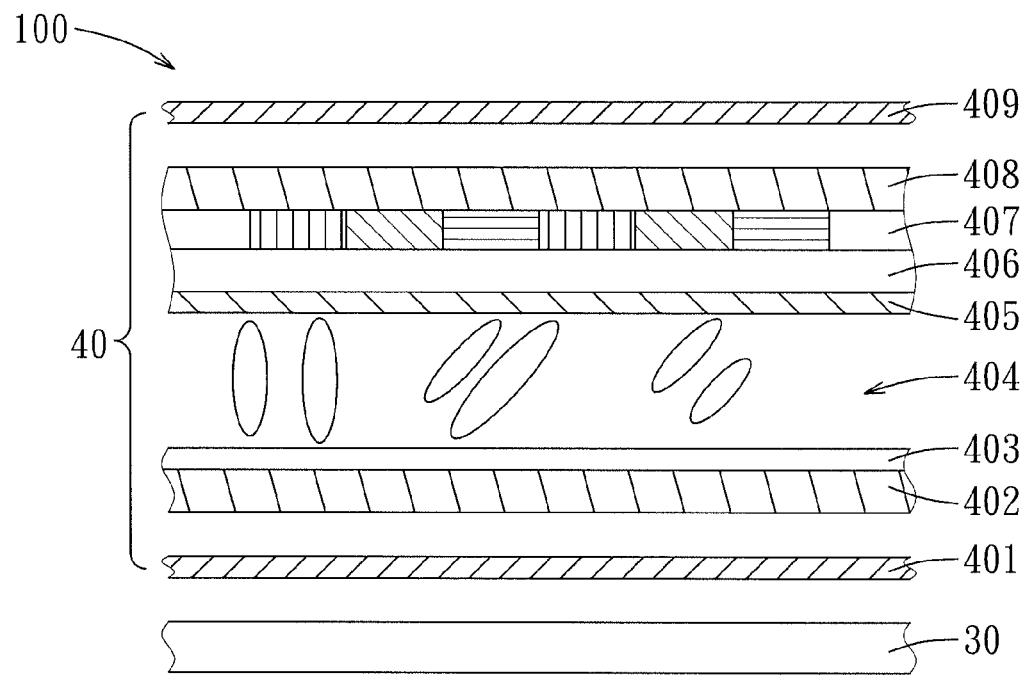
FIG. 10 is an exploded partly sectional view illustrating a display of a second preferred embodiment according to the present invention.

Referring to FIG. 10, a second preferred embodiment of the dual mode touch sensing display 100, according to the present invention, is illustrated. The second preferred embodiment is similar to the first preferred embodiment, but differs in the configuration that the display module 40 of this embodiment includes a plurality of layers. The layers include in sequence a first polarizer 401, a first substrate 402, a pixel layer 403, a liquid crystal layer 404, a common electrode layer 405, an insulator 406, a color filter 407, a second substrate 408, and a second polarizer 409.

In this embodiment, the first conductors 1 and the second conductors 2 of the dual mode touch sensing module (see FIG. 5) are respectively disposed at any adjacent two of the layers between the second polarizer 409 and the insulator 406, that is, at one of between the second substrate 408 and the second polarizer 409, between the color filter 407 and the second substrate 408, and between the insulator 406 and the color filter 407, as long as the dual mode touch sensing module 10 is spaced apart from the common electrode layer 405 so as to prevent the screening effect. However, dispositions thereof are not limited to this embodiment.

Alternatively, the pixel layer 403 may be Slit ITO so as to form a multi-domain pixel display unit. Such an embodiment is similarly capable of reducing the overall thickness of the dual mode touch sensing display 100 and lowering the production cost. Moreover, in FIG. 10, the first substrate 402 of the display module 40 may be a silicon substrate, and the pixel layer 403 is an active matrix disposed on the silicon substrate so as to form a Micro Display Liquid Crystal on Silicon (LCoS) display.

Figure 11:
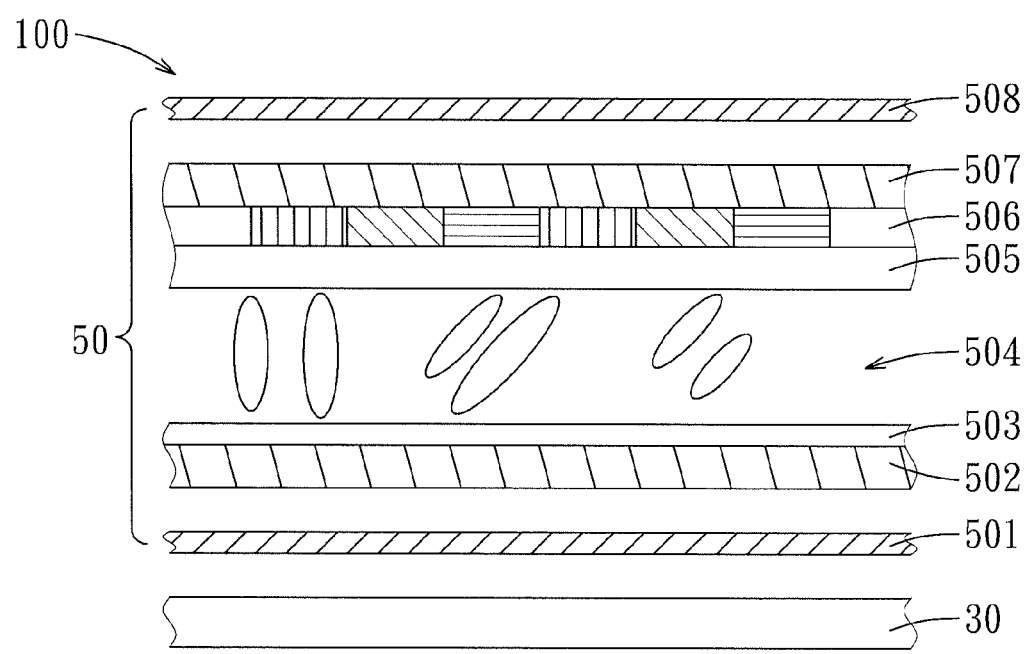
FIG. 11 is an exploded partly sectional view illustrating a display of a third preferred embodiment according to the present invention.

Referring to FIG. 11, a third preferred embodiment of the dual mode touch sensing display 100, according to the present invention, is illustrated. The third preferred embodiment is similar to the second preferred embodiment, but differs in the configuration that the display module 50 of this embodiment includes a plurality of layers. The layers include in sequence a first polarizer 501, a first substrate 502, a common electrode and pixel layer 503, a liquid crystal layer 504, an overcoat layer 505, a color filter 506, a second substrate 507, and a second polarizer 508. It should be noted that the common electrode and pixel layer 503 of this embodiment is formed by integrating the pixel layer 403 and the common electrode layer 405 of the second preferred embodiment (see FIG. 10) into one layer, and the common electrode and pixel layer 503 of the dual mode touch sensing display 100 is selected from an In-Plane Switching (IPS) architecture and a Fringe Field Switching (FFS) architecture.

In the same manner, the first conductors 1 and the second conductors 2 of the dual mode touch sensing module (see FIG. 5) are respectively disposed at any adjacent two of the layers between the second polarizer 508 and the liquid crystal layer 504, that is, at one of between the second substrate 507 and the second polarizer 508, between the color filter 506 and the second substrate 507, between the overcoat layer 505 and the color filter 506, and between the liquid crystal layer 504 and the overcoat layer 505, so as to reduce the overall thickness of the dual mode touch sensing display 100 and to lower the production cost.

It should be noted that the common electrode and pixel layer 503 is selected from a transmissive pixel layer, a reflective pixel layer, and a transflective pixel layer.

It should be noted that, aside from the LCD, the dual mode touch sensing display 100 may be selected from an Organic Light Emitting Display (OLED), an Electrophoretic Display, and an LCoS display, and is not limited to this embodiment.

Figure 12:
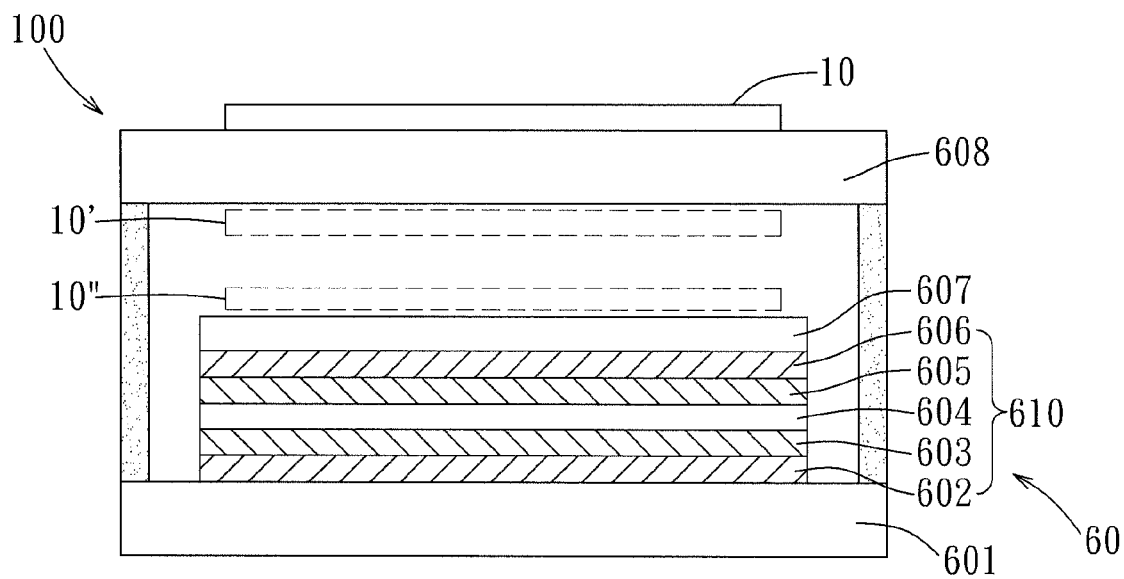
FIG. 12 is a schematic partly sectional view illustrating a display of a fourth preferred embodiment according to the present invention.

Referring to FIG. 12, a fourth preferred embodiment of the dual mode touch sensing display 100, according to the present invention, is illustrated. In this embodiment, the dual mode touch sensing display 100 includes a dual mode touch sensing module 10 and a display module 60. Since structure of the dual mode touch sensing module 10 is similar to that of the first preferred embodiment, details of the same are omitted herein for the sake of brevity. The display module 60 is an Active Matrix Organic Light Emitting Display (AMOLED) panel including in sequence a first substrate 601, an organic light emitting element 610, an insulator 607, and a second substrate 608. The organic light emitting element 610 includes a first electrode 602, a hole transport layer 603, an electroluminescent layer 604, an electron transport layer 605, and a second electrode 606. Furthermore, the first electrode 602 is selected from an amorphous silicon (a-Si) TFT matrix, a low-temperature polycrystalline silicon (LTPS) TFT matrix, etc.

The first conductors 1 and the second conductors 2 of the dual mode touch sensing module 10 are respectively disposed at one side of the second substrate 608 away from the insulator 607 so as to prevent the screening effect attributed to the second electrode 606 when performing capacitive sensing, but are not limited to the disclosure of this embodiment. The first conductors 1 and the second conductors 2 may be further disposed between the second substrate 608 and the insulator 607, for example, at another side of the second substrate 608 proximate to the insulator 607 (see FIG. 12, the dual mode touch sensing module 10' depicted in broken lines), or at one side of the insulator 607 proximate to the second substrate 608 (see FIG. 12, the dual mode touch sensing module 10" depicted in broken lines).

Figure 13:
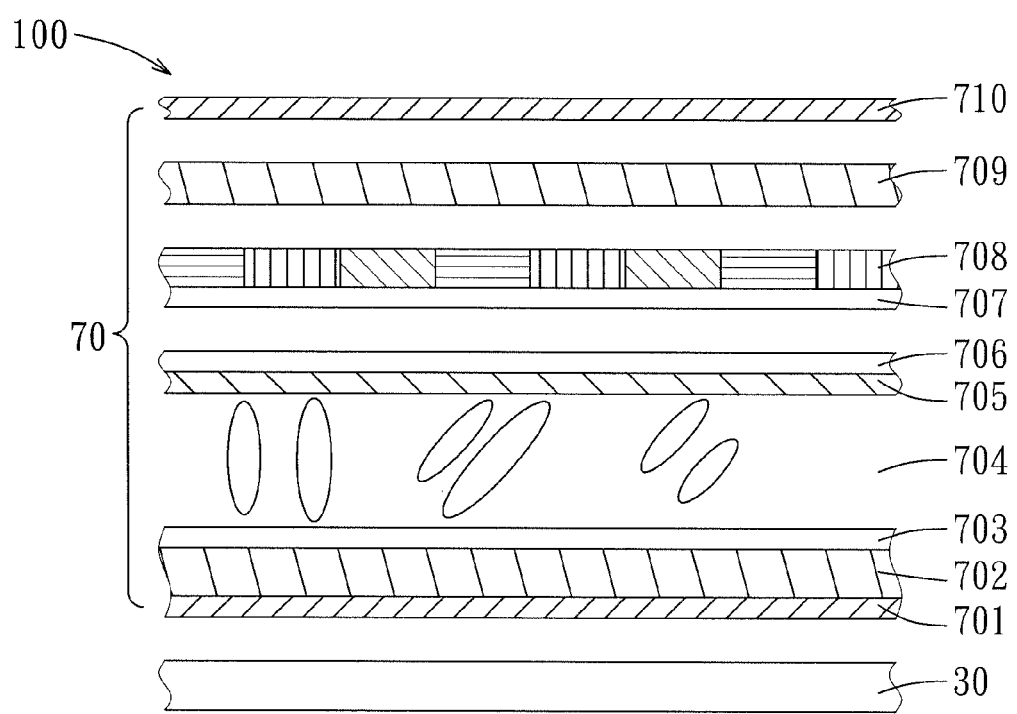
FIG. 13 is an exploded partly sectional view of a display of a fifth preferred embodiment according to the present invention.
Figure 14:
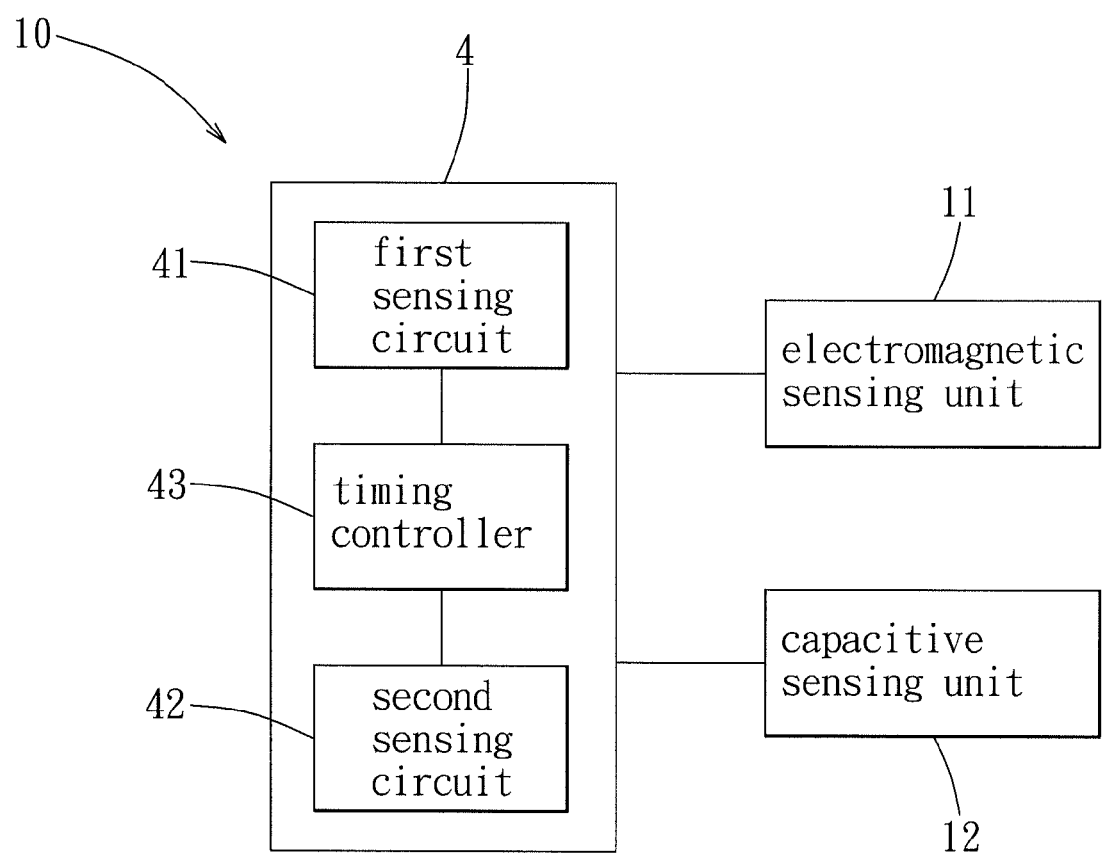
FIG. 14 is a block diagram illustrating the dual mode touch sensing module of the fifth preferred embodiment.

Referring to FIG. 13 and FIG. 14, a fifth preferred embodiment of the dual mode touch sensing display 100, according to the present invention, is illustrated. The dual mode touch sensing display 100 includes a dual mode touch sensing module 10, a display module 70, and a backlight source 30 disposed at one side of the display module 70.

Figure 15:
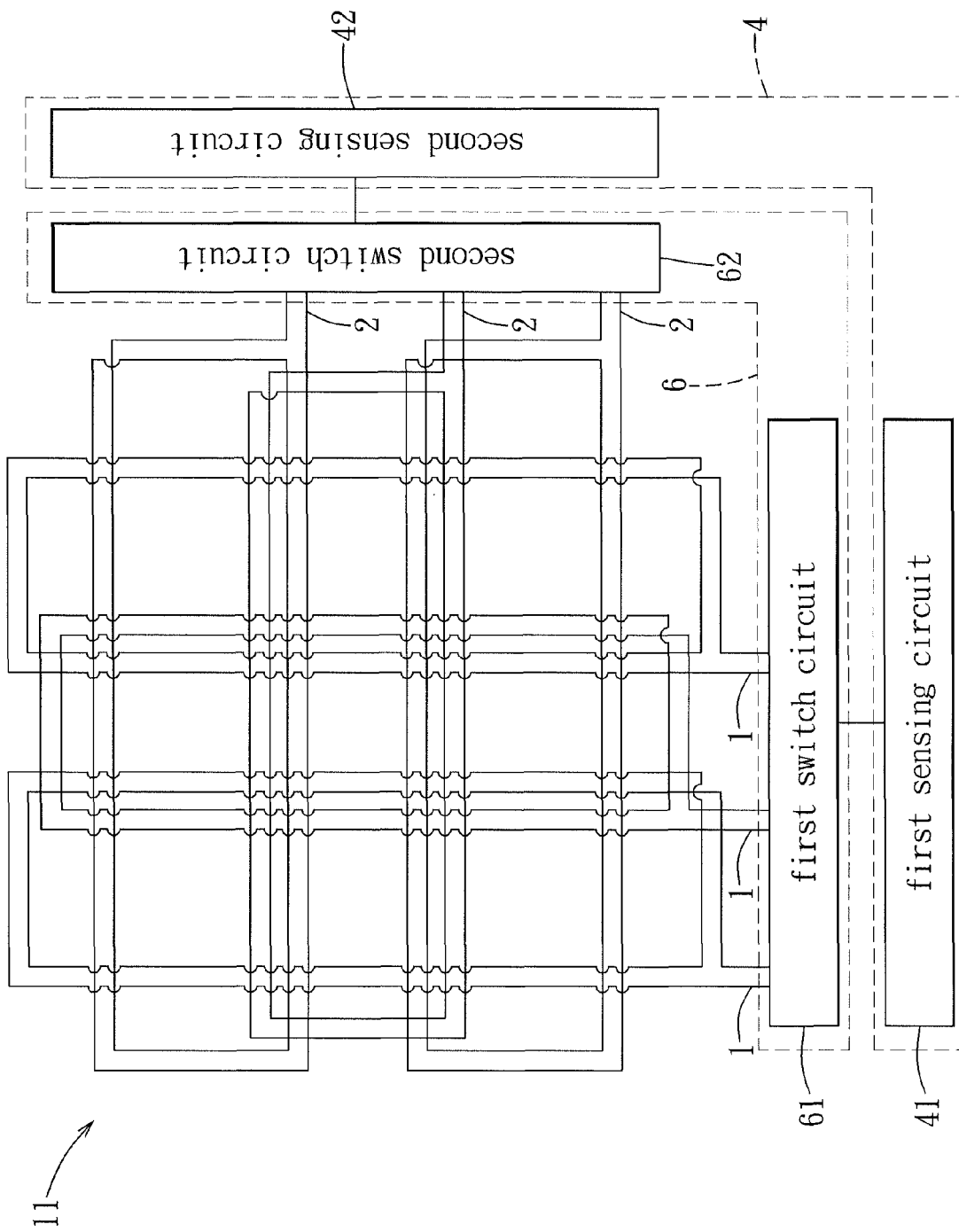
FIG. 15 is a schematic diagram illustrating an electromagnetic sensing unit of the fifth preferred embodiment.
Figure 16:
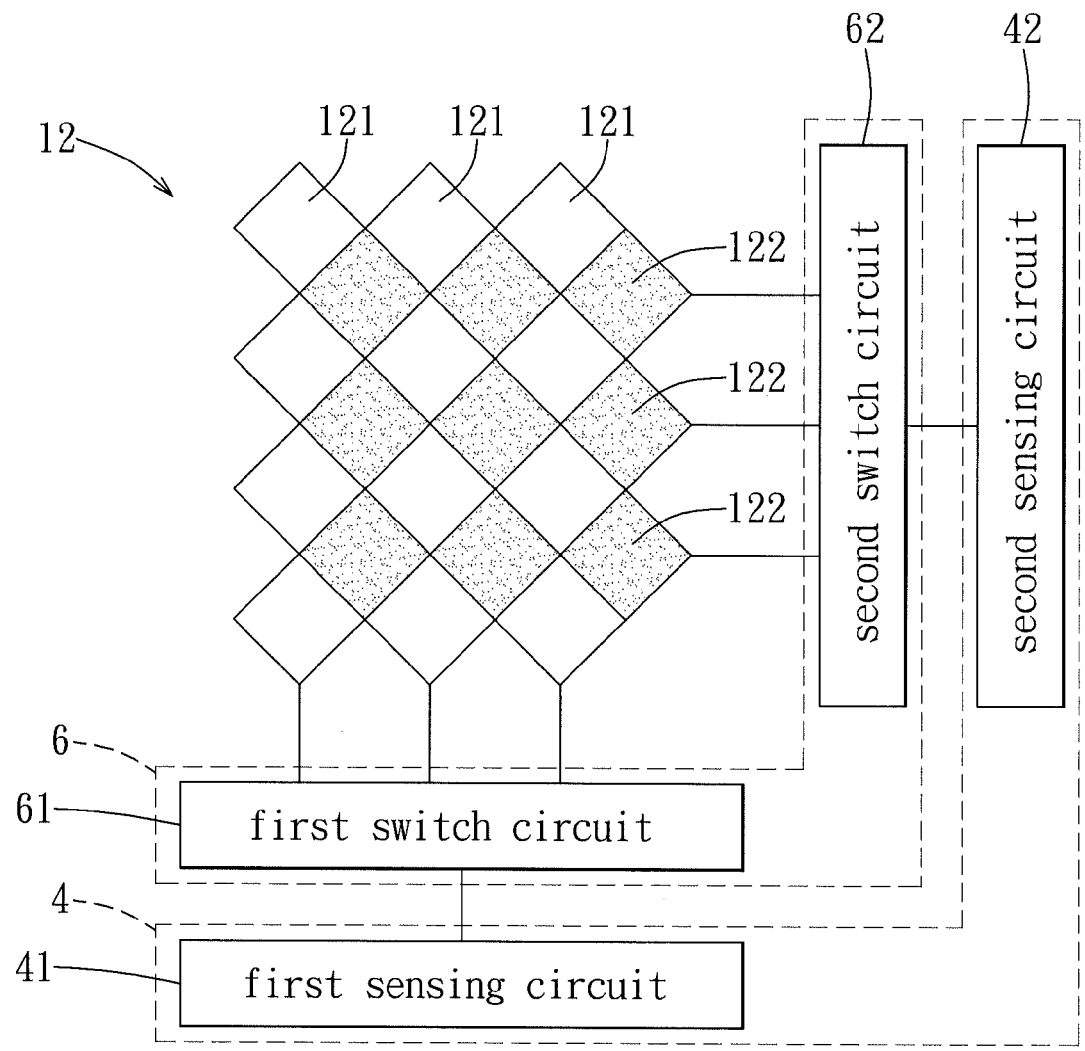
FIG. 16 is a schematic diagram illustrating a capacitive sensing unit of the fifth preferred embodiment.

Referring to FIG. 15 and FIG. 16, the dual mode touch sensing module 10 includes a sensing unit 4, a switch unit 6, an electromagnetic sensing unit 11, and a capacitive sensing unit 12. The sensing unit 4 includes a first sensing circuit 41, a second sensing circuit 42, and a timing controller 43 (see FIG. 14). The switch unit 6 includes a first switch circuit 61 electrically coupled to the first sensing circuit 41, and a second switch circuit 62 electrically coupled to the second sensing circuit 42.

The electromagnetic sensing unit 11 includes a plurality of first conductors 1 and a plurality of second conductors 2. The first conductors 1 are disposed parallel to each other and extend in a first direction (i.e., a longitudinal direction). The second conductors 2 are disposed parallel to each other and extend in a second direction (i.e., a transverse direction). Arrangement of the first and second conductors 1, 2 are similar to those disclosed in the first preferred embodiment. The fifth preferred embodiment differs from the first preferred embodiment in the configurations that each of the first conductors 1 forms a sensing loop, and has two ends electrically coupled to the first switch circuit 61, and that each of the second conductors 2 forms a sensing loop, and has two ends electrically coupled to the second switch circuit 62. The aforesaid sensing loops are disposed parallel to each other, and partially overlap.

Referring to FIG. 14 and FIG. 16, the capacitive sensing unit 12 includes a plurality of first electrode patterns 121 that are disposed parallel to each other and that extend in the first direction, a plurality of second electrode patterns 122 that are disposed parallel to each other and that extend in a second direction, and a dielectric layer (or insulating layer, not shown) disposed between the first electrode patterns 121 and the second electrode patterns 122. The first electrode patterns 121 intersect the second electrode patterns 122. The first electrode patterns 121 overlap the second electrode patterns 122 at overlap portions. Each of the first electrode patterns 121 has an end electrically coupled to the first switch circuit 61. Each of the second electrode patterns 122 has an end electrically coupled to the second switch circuit 62. The first electrode patterns 121 and the second electrode patterns 122 are selected from a rhombus, a diamond, a rectangle, a polygon, a triangle, etc.

It should be noted that the first sensing circuit 41, the second sensing circuit 42, the first switch circuit 61, and the second switch circuit 62 illustrated in FIG. 15 and FIG. 16 are identical. In other words, the two ends of each of the first conductors 1 and the end of each of the first electrode patterns 121 are coupled electrically to the identical first switch circuit 61, and the two ends of each of the second conductors 2 and the end of each of the second electrode patterns 122 are coupled electrically to the identical second switch circuit 62.

Similar to the first preferred embodiment, the timing controller 43 is configured to divide the frame time into three time periods. The first time period T1 is provided for image display by the display module 70. The second time period T2 is the electromagnetic sensing time, during which each of the first sensing circuit 41 and the second sensing circuit 42 is capable of sensing changes in at least one of current, frequency, magnetic flux, and electromagnetic induction on the sensing loops formed by a respective group of the first conductors 1 and the second conductors 2 so as to determine the touch position of one of the electromagnetic stylus and the magnetic stylus (not shown). The third time period T3 is the capacitive sensing time, during which each of the first sensing circuit 41 and the second sensing circuit 42 is further capable of sensing changes in at least one of electric charge, capacitance, and voltage on adjacent ones of the first and second electrode patterns 121, 122 as a result of redistribution of electric charges resulting from mutual induction between the finger and the first and second electrode patterns 121, 122, and capacitors formed between the overlap portions of the first and second electrode patterns 121, 122, so as to determine a touch by the user.

Referring to FIG. 13, the display module 70 includes a plurality of layers. The layers include in sequence a first polarizer 701, a first substrate 702, a pixel layer 703, a liquid crystal layer 704, a common electrode layer 705, a first insulator 706, a second insulator 707, a color filter 708, a second substrate 709, and a second polarizer 710. The first insulator 706 is disposed on the common electrode layer 705, and the second insulator 707 is disposed on the color filter 708.

Since an electromagnetic sensing effect of the electromagnetic sensing unit 11 is hardly influenced by screening effect of a conductive thin film, dispositions of the first conductors 1 and the second conductors 2 of the electromagnetic sensing unit 11 are not limited. The first and second conductors 1, 2 of the electromagnetic sensing unit 11 may be respectively disposed at one of between the second substrate 709 and the second polarizer 710, between the color filter 708 and the second substrate 709, between the second insulator 707 and the color filter 708, between the first insulator 706 and the second insulator 707, between the first substrate 702 and the pixel layer 703, between the first polarizer 701 and the first substrate 702, one side of the first polarizer 701 opposite to the first substrate 702, i.e., between the backlight source 30 and the first polarizer 701, and even in an internal structure of the backlight source 30.

However, since the capacitive sensing effect of the capacitive sensing unit 12 may be adversely influenced by the screening effect of the common electrode layer 705, the capacitive sensing unit 12 is preferably spaced apart from the common electrode layer 705 and away from the backlight source 30 so as to achieve a better sensing effect, and is not limited to this embodiment. In other configurations of this embodiment, the first electrode patterns 121 and the second electrode patterns 122 of the capacitive sensing unit 12 may be respectively disposed between any adjacent two of the layers between the second polarizer 710 and the first insulator 706, that is, one of between the second substrate 709 and the second polarizer 710, between the color filter 708 and the second substrate 709, between the second insulator 707 and the color filter 708, and between the first insulator 706 and the second insulator 707. It should be noted that the first sensing circuit 41 and the second sensing circuit 42 may be disposed at the same layer at which the electromagnetic sensing unit 11 and the capacitive sensing unit 12 are disposed, at different layers, or at an external circuit of the dual mode touch sensing display 100.

It should be noted that, in the first preferred embodiment, the first conductors 1, the second conductors 2, and the switch unit 3 (see FIG. 5) are integrated into the same layer, and the dual mode touch sensing display 100 may combine the electromagnetic sensing function and the capacitive sensing function through switching of the switch unit 3. Nevertheless, in this embodiment, the electromagnetic sensing unit 11 and the capacitive sensing unit 12 are disposed at different layers, and the dual mode touch sensing display 100 may likewise combine the electromagnetic sensing function and the capacitive sensing function by means that each of the first sensing circuit 41 and the second sensing circuit 42 is configured to sense the changes in at least one of current, frequency, voltage, magnetic flux, and electromagnetic induction on a respective one of the first and second conductors 1, 2, and is further configured to sense the changes in at least one of electric charge, capacitance, and voltage on adjacent ones of the first and second electrode patterns 121, 122, respectively. Moreover, since the dual mode touch sensing module 10 is disposed in the display module 70, the overall thickness of the dual mode touch sensing display 100 may be reduced, and the production cost thereof may be lowered.

Figure 17:
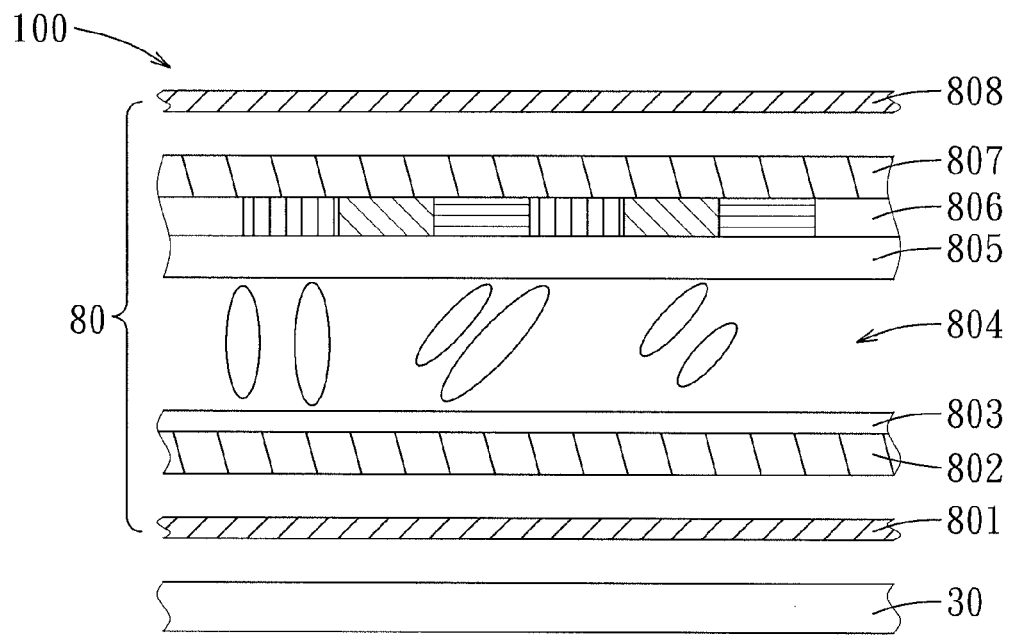
FIG. 17 is an exploded partly sectional view illustrating a display of a sixth preferred embodiment according to the present invention.

Referring to FIG. 17, a sixth preferred embodiment of the dual mode touch sensing display 100, according to the present invention, is illustrated. The sixth preferred embodiment is similar to the fifth preferred embodiment, but differs in the configuration that the display module 80 includes a plurality of layers. The layers include in sequence a first polarizer 801, a first substrate 802, a common electrode and pixel layer 803, a liquid crystal layer 804, an overcoat layer 805, a color filter 806, a second substrate 807, and a second polarizer 808.

The first and second conductors 1, 2 of the electromagnetic sensing unit 11 (see FIG. 15) are respectively disposed at one of between the second substrate 807 and the second polarizer 808, between the color filter 806 and the second substrate 807, between the overcoat layer 805 and the color filter 806, between the liquid crystal layer 804 and the overcoat layer 805, between the first substrate 802 and the common electrode and pixel layer 803, between the first polarizer 801 and the first substrate 802, one side of the first polarizer 801 opposite to the first substrate 802, i.e., between the backlight source 30 and the first polarizer 801, and even in the internal structure of the backlight source 30.

The first and second electrode patterns 121, 122 of the capacitive sensing unit 12 (see FIG. 16) are respectively disposed between any adjacent two of the layers between the second polarizer 807 and the liquid crystal layer 804, that is, between the color filter 806 and the second substrate 807, between the overcoat layer 805 and the color filter 806, and between the liquid crystal layer 804 and the overcoat layer 805.

It should be noted that aside from this embodiment, a disposition manner of the first and second conductors 1, 2 of the electromagnetic sensing unit 11, and a disposition manner of the first and second electrode patterns 121, 122 of the capacitive sensing unit 12 are applicable to internal components of various kinds of displays, and should not be limited to the disclosure in this embodiment.

Figure 18:
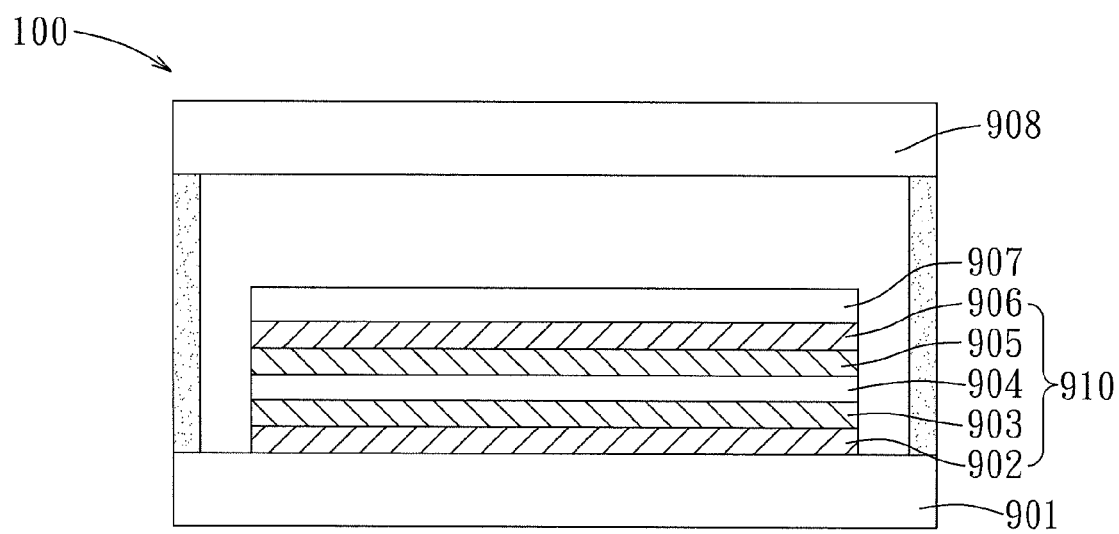
FIG. 18 is a schematic partly sectional view of a display of a seventh preferred embodiment according to the present invention.

Referring to FIG. 18, a seventh preferred embodiment of the dual mode touch sensing display 100, according to the present invention, is illustrated. The seventh preferred embodiment is similar to the fifth preferred embodiment, but differs in the configuration that the display module 90 is an AMOLED including in sequence a first substrate 901, an organic light emitting element 910, an insulator 907, and a second substrate 908. The organic light emitting element 910 includes a first electrode 902, a hole transport layer 903, an electroluminescent layer 904, an electron transport layer 905, and a second electrode 906.

The first and second conductors 1, 2 of the electromagnetic sensing unit 11 of the dual mode touch sensing module 10 (see FIGS. 14 and 15) are respectively disposed at one of one side of the second substrate 908 away from the insulator 907, between the second substrate 908 and the insulator 907, between the insulator 907 and the organic light emitting element 910, between the organic light emitting element 910 and the first substrate 901, and one side of the first substrate 901 away from the organic light emitting element 910. The first and second electrode patterns 121, 122 of the capacitive sensing unit 12 (see FIG. 16) are respectively disposed at one of one side of the second substrate 908 away from the insulator 907, and between the second substrate 908 and the insulator 907, so as to prevent the shielding effect of the second electrode 906 when performing the capacitive sensing function.

Figure 19:
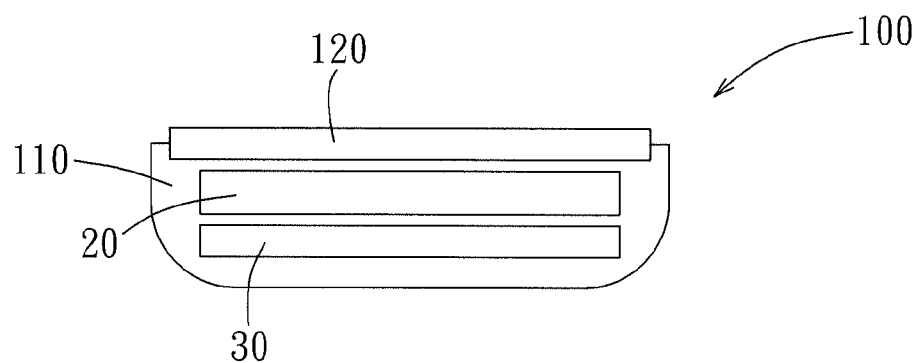
FIG. 19 is a schematic view of a display of an eighth preferred embodiment according to the present invention.
Figure 20:
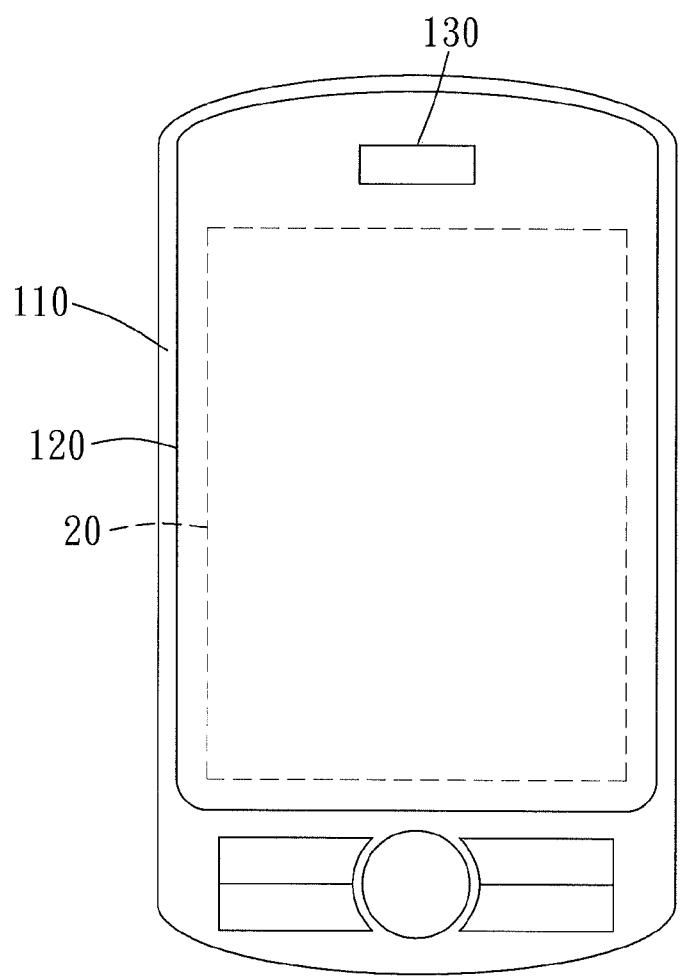
FIG. 20 is a schematic view illustrating a housing, which includes a protection panel corresponding in position to the display module, of the eighth preferred embodiment.

Referring to FIG. 19, an eighth preferred embodiment of the dual mode touch sensing display 100, according to the present invention, is similar to the first preferred embodiment, but differs in the configuration that the dual mode touch sensing display 100 further comprises a housing 110 for accommodating the dual mode touch sensing module 10 (not shown in FIG. 19), the display module 20, and the backlight source 30. Referring to FIG. 20, the housing 110 includes a protection panel 120 corresponding in position to the display module 20. In this embodiment, the protection panel 120 is a cover glass. The dual mode touch sensing module 10 is disposed at one of between the protection panel 120 and the display module 20, one side of the protection panel 120 away from the display module 20, and in the protection panel 120 (the protection panel 120 may have a multi-layer structure). In another configuration of this embodiment, the first and second conductors 1, 2 of the dual mode touch sensing module 10 are disposed at two opposite sides of the protection panel 120, respectively. In this way, the overall thickness of the dual mode touch sensing display 100 may be reduced, and the production cost thereof may be lowered.

It should be noted that a structure of the display module 20 may be selected from any one of the structures illustrated in the first to seventh preferred embodiments. The dual mode touch sensing module 10 may include one of the switch unit 3 as illustrated in the first preferred embodiment (see FIG. 5), and the electromagnetic sensing unit 11 and the capacitive sensing unit 12 as illustrated in the fifth preferred embodiment (see FIG. 14), and is not limited to the disclosure in the present invention. Furthermore, referring to FIG. 20, a shape of the protection panel 120 is selected from an ellipse, a quadrilateral, a polygon, a circular shape, etc., and an area of the protection panel 120 is larger than a display region of the display module 20. The protection panel 120 may be provided with at least one aperture for dispositions of a camera, a speaker, a microphone, and so forth.

In summary, the dual mode touch sensing display 100 of the present invention adopts a design of disposing the dual mode touch sensing module 10 in the display module 20, 40, 50, 60, 70, 80 and 90, so as to reduce the overall thickness of the dual mode touch sensing display 100, to lower the production cost thereof, and to combine a stylus input function and a finger input function for satisfying various demands. Moreover, in the dual mode touch sensing module 10, the first conductors 1, the second conductors 2, and the switch unit 3 are integrated into one layer, and by means of switching of the switch unit 3, the dual mode touch sensing display 100 may combine the capacitive sensing function and the electromagnetic sensing function so as to achieve the object of the present invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A dual mode touch sensing module comprising:
   a plurality of first conductors that are disposed parallel to each other and that extend in a first direction;
   a plurality of second conductors that are disposed parallel to each other and that extend in a second direction intersecting the first direction, said second conductors crossing said first conductors at an angle;
   an insulating layer that is disposed at intersections of said first conductors and said second conductors to space said first conductors apart from said second conductors;
   a switch unit including a first switch circuit coupled to said first conductors, and a second switch circuit coupled to said second conductors; said first switch circuit being capable of interconnecting at least a portion of said first conductors to form sensing loops, said second switch circuit being capable of interconnecting at least a portion of said second conductors to form sensing loops; and
   a sensing unit that is configured to sense signals on said first conductors and said second conductors, said sensing unit including a first sensing circuit coupled to one end of each of said first conductors, a second sensing circuit coupled to one end of each of said second conductors, and a timing controller coupled to said first sensing circuit, said second sensing circuit, said first switch circuit, and said second switch circuit;
   wherein said timing controller is configured to divide a frame time into first, second and third time periods, the first time period being provided for image display;
   wherein the second time period is electromagnetic sensing time, during which bidirectional electromagnetic sensing is to be performed, and said timing controller is configured to control said first switch circuit to electrically interconnect in sequence one of two adjacent said first conductors and two said first conductors spaced at a first predetermined distance, so that the sensing loops are formed, said timing controller being further configured to control said first sensing circuit to generate a detecting signal, and to detect changes associated with a current flow of the detecting signal through a respective one of the sensing loops, so as to sense a touch, after all sensing processes of said first conductors are successfully completed, said timing controller is further configured to control said second switch circuit to electrically interconnect in sequence one of two adjacent said second conductors and two said second conductors spaced at a second predetermined distance, so that the sensing loops are formed, said second sensing circuit being capable of sensing signals on all of said second conductors so as to determine a touch position after the bidirectional electromagnetic sensing is performed; and
   wherein the third time period is capacitive sensing time, during which said timing controller is configured to turn said first switch circuit and said second switch circuit off, so that said first conductors are not coupled electrically with each other, said first sensing circuit and said second sensing circuit utilizing capacitors formed at the intersections of said first and second conductors, and induction capacitors formed between said first and second conductors to sense changes in at least one of electric charge, capacitance, voltage, and current on said capacitors so as to detect the touch position.

2. The dual mode touch sensing module as claimed in claim 1, wherein said first conductors are M in number, and said second conductors are N in number, each of the numbers M and N being independently a positive integer greater than 1, said first conductors crossing said second conductors to form a M×N sensing matrix, the angle at which said first conductors cross said second conductors ranging from 60 degrees to 120 degrees.

3. The dual mode touch sensing module as claimed in claim 1, wherein said first switch circuit includes a first common line, at least one first control line, a plurality of first switch members, and a first gate driver coupled to said at least one first control line,
   said first switch members corresponding in number to said first conductors,
   each of said first switch members having a first end coupled to one end of a respective one of said first conductors, a second end coupled to said first common line, and a control end coupled to said at least one first control line.

4. The dual mode touch sensing module as claimed in claim 1, wherein said second switch circuit includes a second common line, at least one second control line, a plurality of second switch members, and a second gate driver coupled to said at least one second control line,
   said second switch members corresponding in number to said second conductors,
   each of said second switch members having a first end coupled to one end of a respective one of said second conductors, a second end coupled to said second common line, and a control end coupled to said at least one second control line.

5. The dual mode touch sensing module as claimed in claim 1, wherein said first conductors are disposed at a first layer, said second conductors are disposed at a second layer, and said first and second layers are spaced apart from each other by said insulating layer.

6. The dual mode touch sensing module as claimed in claim 1, wherein said first conductors and a first segment of said second conductors are disposed at a first layer and are covered by and spaced apart from each other by said insulating layer, and wherein a second segment of said second conductors is disposed at a second layer on one side of said insulating layer opposite to said first layer and extends through said insulating layer to connect electrically with said first segment of said second conductors.

7. A dual mode touch sensing display comprising:
   a display module; and
   a dual mode touch sensing module disposed at said display module and including:

a plurality of first conductors that are disposed parallel to each other and that extend in a first direction, a plurality of second conductors that are disposed parallel to each other and that extend in a second direction intersecting the first direction, said second conductors crossing said first conductors at an angle, an insulating layer that is disposed at intersections of said first conductors and said second conductors to space said first conductors apart from said second conductors, a switch unit including a first switch circuit coupled to said first conductors, and a second switch circuit coupled to said second conductors; said first switch circuit being capable of interconnecting at least a portion of said first conductors to form sensing loops, and said second switch circuit being capable of interconnecting at least a portion of said second conductors to form sensing loops; and a sensing unit that is configured to sense signals on said first conductors and said second conductors, said sensing unit including a first sensing circuit coupled to one end of each of said first conductors, a second sensing circuit coupled to one end of each of said second conductors, and a timing controller coupled to said first sensing circuit, said second sensing circuit, said first switch circuit, and said second switch circuit;

wherein said timing controller is configured to divide a frame time into first, second and third time periods, the first time period being provided for image display;

wherein the second time period is electromagnetic sensing time, during which bidirectional electromagnetic sensing is to be performed, and said timing controller is configured to control said first switch circuit to electrically interconnect in sequence one of two adjacent said first conductors and two said first conductors spaced at a first predetermined distance, so that the sensing loops are formed, said timing controller being further configured to control said first sensing circuit to generate a detecting signal, and to detect changes associated with a current flow of the detecting signal through a respective one of the sensing loops, so as to sense a touch, after all sensing processes of said first conductors are successfully completed, said timing controller is further configured to control said second switch circuit to electrically interconnect in sequence one of two adjacent said second conductors and two said second conductors spaced at a second predetermined distance, so that the sensing loops are formed, said second sensing circuit being capable of sensing signals on all of said second conductors so as to determine a touch position after the bidirectional electromagnetic sensing is performed; and wherein the third time period is capacitive sensing time, during which said timing controller is configured to turn said first switch circuit and said second switch circuit off, so that said first conductors are not coupled electrically with each other, said first sensing circuit and said second sensing circuit utilizing capacitors formed at the intersections of said first and second conductors, and induction capacitors formed between said first and second conductors to sense changes in at least one of electric charge, capacitance, voltage, and current on said capacitors so as to detect the touch position.

8. The dual mode touch sensing display as claimed in claim 7, wherein said display module is a liquid crystal display module including a plurality of layers, said layers including in sequence a first polarizer, a first substrate, a color filter, a common electrode layer, a liquid crystal layer, a pixel layer, a second substrate, and a second polarizer, said first conductors and said second conductors of said dual mode touch sensing module being respectively disposed at any adjacent two of said layers between said second polarizer and said pixel layer.

9. The dual mode touch sensing display as claimed in claim 7, wherein said display module is a liquid crystal display module including a plurality of layers, said layers including in sequence a first polarizer, a first substrate, a pixel layer, a liquid crystal layer, a common electrode layer, an insulator, a color filter, a second substrate, and a second polarizer, said first conductors and said second conductors of said dual mode touch sensing module being respectively disposed at any adjacent two of said layers between said second polarizer and said insulator.

10. The dual mode touch sensing display as claimed in claim 7, wherein said display module is a liquid crystal display module including a plurality of layers, said layers including in sequence a first polarizer, a first substrate, a common electrode and pixel layer, a liquid crystal layer, an overcoat layer, a color filter, a second substrate, and a second polarizer, said first conductors and said second conductors of said dual mode touch sensing module being respectively disposed at any adjacent two of said layers between said second polarizer and said liquid crystal layer.

11. The dual mode touch sensing display as claimed in claim 7, wherein said display module is an Active Matrix Organic Light Emitting Display (AMOLED) including in sequence a first substrate, an organic light emitting element, an insulator, and a second substrate, said first conductors and said second conductors of said dual mode touch sensing module being respectively disposed at one of one side of said second substrate away from said insulator, and between said second substrate and said insulator.

12. The dual mode touch sensing display as claimed in claim 7, further comprising a housing for accommodating said display module and said dual mode touch sensing module, said housing including a protection panel corresponding in position to said display module, said first conductors and said second conductors of said dual mode touch sensing module being respectively disposed at one of
between said protection panel and said display module,
at one side of said protection panel away from said display module, and in said protection panel.

13. The dual mode touch sensing display as claimed in claim 7, wherein said display module is an Active Matrix Organic Light Emitting Display (AMOLED) including in sequence a first substrate, an organic light emitting element, an insulator, and a second substrate,
said dual mode touch sensing display further comprising a housing for accommodating said AMOLED and said dual mode touch sensing module, said housing including a protection panel corresponding in position to said display module, said first conductors and said second conductors of said dual mode touch sensing module being respectively disposed at one of
at one side of said second substrate away from said insulator,
between said second substrate and said insulator,
between said protection panel and said display module,
at one side of said protection panel away from said display module, and
in said protection panel.

* * * * *